350-96.24 SR
XR 3,636,365
7X 3072K

United S [15] 3,636,365
Houston, Jr. [45] Jan. 18, 1972

[54] MECHANICAL RASTER SCANNER MEANS USING FIBER OPTICS FOR PATTERN RECOGNITION OR DISPLAY

[72] Inventor: George Porter Houston, Jr., Baltimore, Md.
[73] Assignee: The Bendix Corporation

[22] Filed: June 17, 1970
[21] Appl. No.: 47,072

[52] U.S. Cl. ....................250/227, 350/96 B
[51] Int. Cl. ....................G02b 5/14
[58] Field of Search ....................250/219 R, 219 CR, 227; 350/96 B

[56] References Cited

UNITED STATES PATENTS

| | | | |
|---|---|---|---|
| 3,354,319 | 11/1967 | Loewen et al. | 250/227 |
| 3,393,800 | 7/1968 | Durand, Jr. | 250/227 X |
| 3,436,757 | 4/1969 | Schwab | 250/227 X |

*Primary Examiner*—Archie R. Borchelt
*Attorney*—Plante, Arens, Hartz, Smith & Thompson, Bruce L. Lamb and William G. Christoforo

[57] ABSTRACT

An image field centrally located on a stationary disk is comprised of layered coherent fiber sections of high-light transmissivity, each section extending from the image field to termination at the disk face equally spaced radial lines. A rotating disk concentric with the stationary disk and adjacent thereto includes an incoherent or coherent high-light transmissivity fiber section having a line input end generally skewed with respect to a radial so as to scan consecutively each element of each coherent section termination as the disks rotate relative to one another. The incoherent section terminates in a generally circular bundle centrally located on the rotating disk and is observed by a photocell through a light modulator.

In a second embodiment the mechanical raster scan means is used to reproduce on the image face a desired visual display by replacing the photocell with a constant light device and by means of the light modulator modulating the light which illuminates the circular bundle end in accordance with signals corresponding to the desired visual display. If these signals are properly synchronized with the rotation of the disk the desired visual display will be reproduced at the image face.

13 Claims, 6 Drawing Figures

INVENTOR
G. PORTER HOUSTON JR.
BY
William G. Christoforo
ATTORNEY

INVENTOR
G. PORTER HOUSTON JR.
BY
William G. Christoforo
ATTORNEY

MECHANICAL RASTER SCANNER MEANS USING FIBER OPTICS FOR PATTERN RECOGNITION OR DISPLAY

BACKGROUND OF THE INVENTION

The invention relates to mechanical means of optically scanning an image face raster and more particularly to such mechanical means which additionally include an electro-optic light modulator which is electrically modulated in accordance with pattern recognition principles to provide pattern recognition capability of the device or which modulator may be modulated by electrical signals corresponding to a desired visual display to thereby reproduce the desired display at the image face.

The various devices for scanning a field of view so as to reduce it to its individual elements for processing in pattern recognition equipment are already well known in the art. One such type of field of view scanner is the so-called flying spot scanner which through the use of a moving electron beam which is made to scan over a field of view reduces the individual elements of the field of view into electrical signals which may be further processed in accordance with pattern recognition techniques. It is, however, an object of this invention to provide a basically mechanical type of scanning device.

It is another object of this invention to provide a scanning device which can be used not only to scan a field of view but which may also be used to transform an electrical signal corresponding to a desired display into a visual manifestation of that display.

It is another object of this invention to provide a scanning device of the type described and which includes fiber optics.

SUMMARY OF THE INVENTION

The device described herein is basically comprised of a pair of concentric disks which are made to rotate about a concentric axis relative to one another. An image field centrally located in a first disk is comprised of layered coherent sections of individual high light transmissivity fibers, each fiber extending from the image field to a point on one of a plurality of radial lines, which radial lines are equally spaced within two imaginary circles on the outer portion of the disk and concentric therewith. Generally, the fibers comprising each layered section comprise a single radial line with the fibers extending from the layer sections to the radial lines in a predetermined ordered manner. The longitudinal axis of the fibers at either end are arranged parallel to the axis of the first disk.

A second disk concentrically rotating with respect to the first disk and adjacent thereto includes a skewed scanning slit in a line configuration comprised of first end sections of an optionally incoherent fiber bundle. The scanning slit is located on the second disk within the two imaginary circles mentioned earlier and with the long axis of the fibers at the end thereof parallel to the axis rotation. Thus, as the second disk rotates relative to the first disk, the scanning slit sweeps through the area between the two imaginary circles. The fiber bundle whose first end sections comprise the scanning slit extend optionally incoherently from the scanning slit to a generally circular configuration at the center of the second disk where the second ends of the fibers comprising the bundle are arranged so that the longitudinal axis of the fibers at that point are parallel to the second disk axis of rotation.

The second ends of the incoherent bundle are exposed to a photocell or alternately a light source through a light modulator, that is, a device whose light transmissibility characteristics vary in accordance with an applied signal. KDP crystals have been found eminently suitable for this purpose and at the present time are so used by those skilled in the art.

In a first mode of use as the disks rotate relative to one another with an image of interest projected upon the image face, the scanning slit observes sequentially and in an orderly manner, each element of each layered section of the image face through the fibers whose ends are arranged at the image face and at the first disk radial lines. These observed elemental portions of the image face are now transmitted through the incoherent fiber bundle to the center of the second disk and observed through the KDP crystal by the photocell. If the KDP crystal is now modulated in synchronism with the disk rotation by electrical signals corresponding to optical weights suitably chosen in accordance with the adaline pattern recognition principles, pattern recognition of the image projected upon the image face will be accomplished.

In a second mode of use the photocell is replaced by a light source and the KDP crystal is modulated in synchronism with the disk rotation by electrical signals corresponding to an image to be reproduced, much in the manner of a TV system. This image will now be optically generated and viewable at the image face. The same result will be obtained if the KDP crystal is eliminated and the photocell is replaced by a light source which is modulated in synchronism with disk rotation by electrical signals corresponding to the image to be reproduced.

DESCRIPTION OF THE PREFERRED EMBODIMENT

Figure 1:
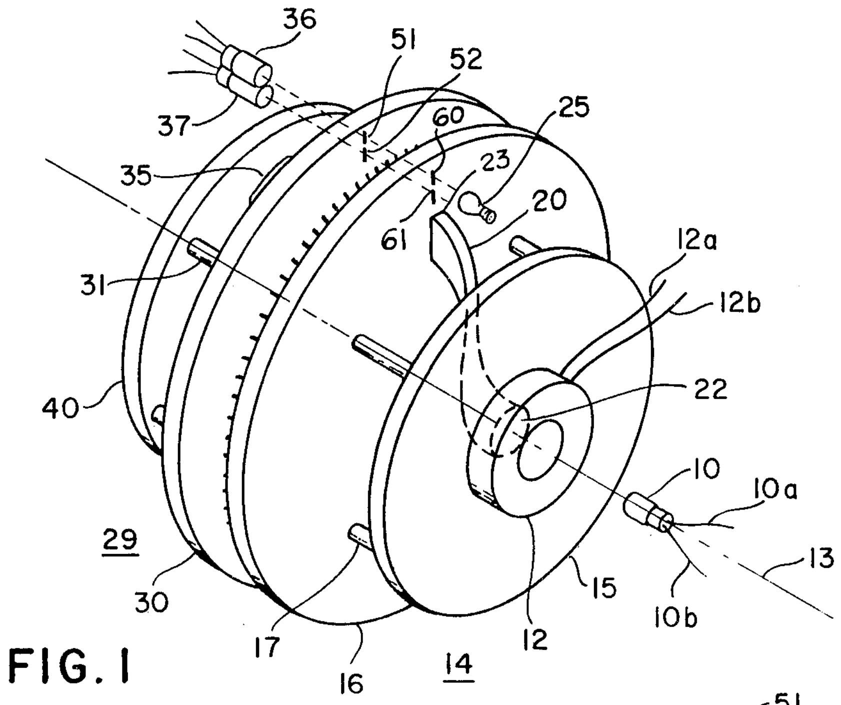
FIG. 1 is an oblique view of the invention.
Figure 5:
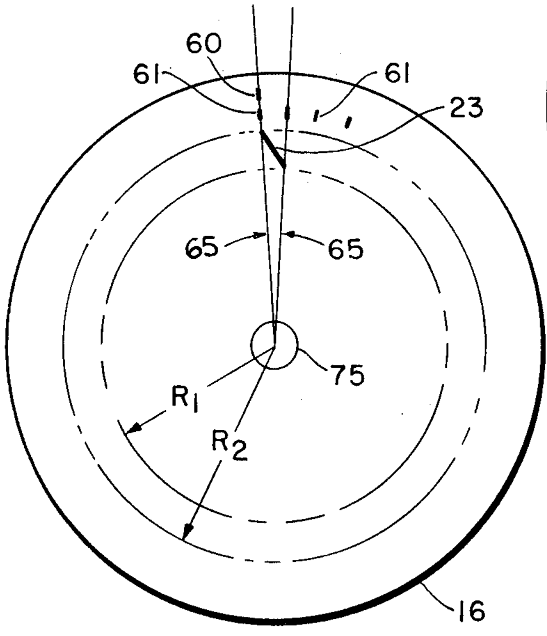
FIG. 5 shows the scanning slit plate in greater detail.

In the description of the preferred embodiment to follow it should be considered that the mechanical raster scanner described might operate in at least two modes. In a first mode of operation an optical image is projected against an image face and scanned mechanically point by point with the output appearing at a signal output point in the form of an analog optical signal. In a second mode of operation the output point is illuminated by a light source which is modulated in accordance with a signal corresponding to an image to be displayed, the mechanical raster scanner now reproducing this image upon the image face. Referring first to FIG. 1 wherein like numerals in the various figures refer to identical items and wherein there is seen an item 10 which is suitably a photocell when the device is used for pattern recognition of an image falling upon its image face and which alternately is suitably a light source when the device is used to reproduce an image at the image face in accordance with signals to be applied to the light modulator to be described. Numerals **10*a* and 10*b* designate the electrical leads connected to item 10. A light modulator 12 is interposed in the optical path between item 10 and an output spot 22. Item 10 and light modulator 12 need not be attached to disk 14. The light modulator is anyone of that group of devices whose transmissivity to light can be varied in accordance with an applied signal, one example of which might be complementary Polaroid filters driven in accordance with the applied signal. Optimally the light modulator is a KDP crystal, which is a type of crystal known to those skilled in the art whose light transmissivity varies in accordance with applied electrical signals. As previously mentioned, when the scanner is operated to generate an optical image at the image face in accordance with electrical signals corresponding to that image, the light source can be modulated directly by the electrical signals and the light modulator 12 eliminated. The manner in which these electrical signals are generated do not comprise the invention herein but means therefor are known to those skilled in the art and are accordingly not treated here. Numerals 12*a* and 12*b* indicate the leads via which the signal is applied to the light modulator 12. A disk 14 which is made to rotate, preferably at a constant speed, about its longitudinal axis 13, by means not shown, is comprised of an output faceplate 15 and a scanning slit plate 16 rigidly connected to one another by means such as posts 17 so as to hold these plates parallel to one another. A bundle of optical fibers 20, suitably arranged incoherently, extends from one end at a scanning slit 23 in plate 16 to an output end 22 concentric with plate 15. Since plates 15 and 16 are parallel to one another, the ends of bundle 20 are also parallel to one another and to the plates. It can be seen that fiber bundle end 22 is arranged in a generally circular configuration. Plate 16 is seen in greater detail in FIG. 5, reference to which should now be made. Plate 16 includes a single scanning slit 23 into which the incoherent fiber bundle 20 of FIG. 1 is terminated. Scanning slit 23 is constructed between the circles defined by radii $R_1$ and $R_2$ and within arc 65 defined by plate radial lines extending through the center of adjacent timing slits 61. The manner in which this angle is determined is described below. A plurality of timing slits 61 are located concentrically and equally spaced about plate 16. In this particular embodiment 60 timing slits 61 are provided, this being the number of sections comprising the image face to be described. For the sake of clarity, all timing slits 61 are not shown. A single timing slit 60 is provided coradial with one of the timing slits 61. It will be shown later that timing slits 60 and 61 can provide synchronization of the rotating disk with the signal applied to the light modulator, and in particular the slit 60 will provide information as to the beginning of a single scan of the image face while the slits 61 provide information as to the beginning of the scan of a single section comprising the image face. Numeral 75 represents means by which plate 16 and hence disk 14** may be rotated, the exact rotational means not being a part of this invention and hence is not shown.

Figure 3:
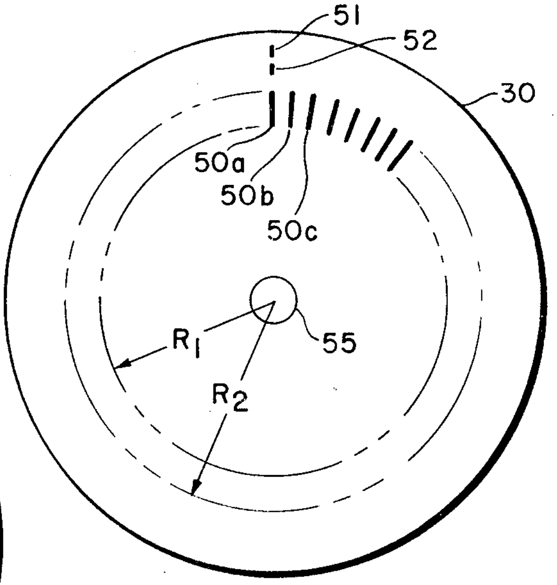
FIG. 3 shows the image faceplate in greater detail.
Figure 2:
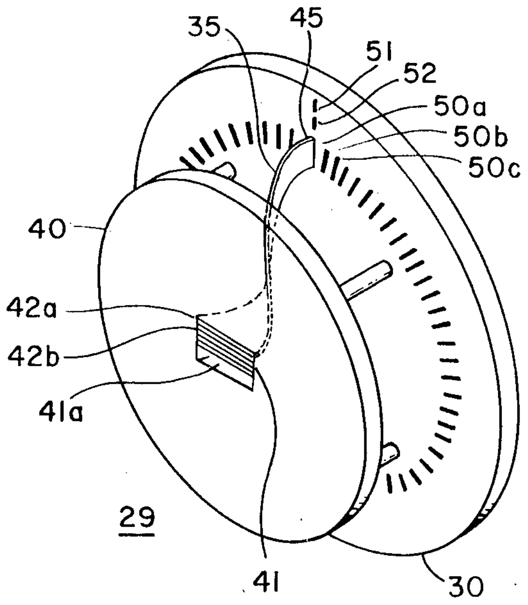
FIG. 2 is another oblique view of a portion of the invention showing the image face.
Figure 4:
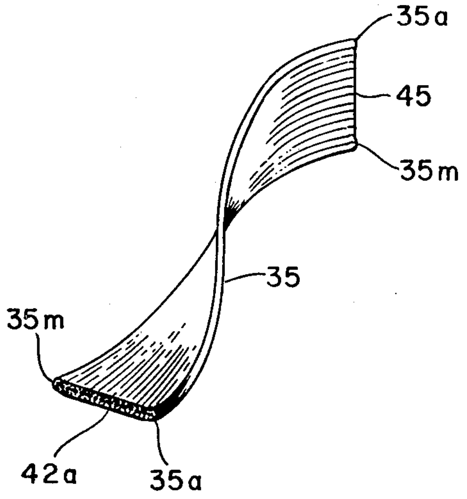
FIG. 4 shows a single coherent fiber optical bundle.
Figure 6:
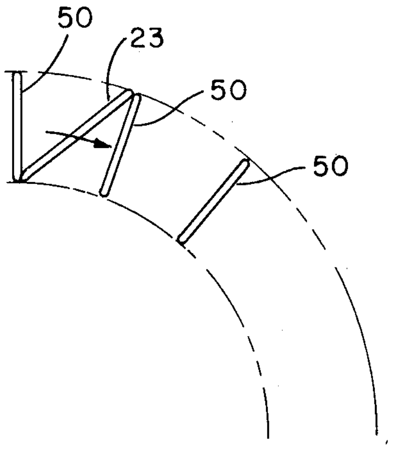
FIG. 6 shows superimposed the scanning slit as it sweeps past certain of the radial slits.

Referring again to FIG. 1 a stationary disk 29 is seen to be comprised of a radial line plate 30 and an image faceplate 40 suitably fastened together by posts 31 so as to hold these latter two plates parallel to one another. FIG. 2 shows disk 29 in clearer detail, while FIG. 3 shows plate 30 in greater detail, reference to which latter two figures should now be made. Image faceplate 40 includes a concentric image face hole **41*a*, which in this embodiment is shown as square, in which are terminated in layered sections 42*a*, 42*b*, etc., coherent fiber bundles, of which, for the sake of clarity, only coherent fiber bundle 35 is fully shown. The layered ends 42*a*, 42*b*, etc., of the various coherent fiber bundles comprise image face 41. Coherent fiber bundle 35 is also seen in FIG. 4 reference to which should now be made. Bundle 35 extends from end 42*a*, which it will be remembered comprises one layer of the image face, to an end 45. The individual fibers comprising bundle 35 are arranged coherently, that is, in ordered manner from end 42*a* to end 45. For example, a fiber 35*a* located to the left side of end 42*a* proceeds in ordered manner therefrom to the top of end 45, while a fiber 35*m* on the right side of end 42*a* proceeds in ordered manner therefrom to the bottom of end 45. Returning again to FIGS. 2 and 3 it can be seen that fiber bundle end 45 is inserted into radial slit 50*a*. Other coherent fiber bundles which are not shown extend from the various layered sections of the image face to the other radial slots on plate 30, for example slits 50*b* and 50*c*. More specifically, and as an example, a second coherent fiber bundle extends from end 42*b* to radial slit 50*b*. The arrangement of the other coherent fiber bundles should now be obvious. The radial slits 50*a*, 50*b*, etc., on plate 30 are located within the circles defined by radii $R_1$ and $R_2$ as shown, radii $R_1$ and $R_2$ in this figure being identical to radii $R_1$ and $R_2$ of FIG. 5. The radial slits are equally spaced about plate 30, the number of radial slits being equal to the number of layered sections into which the image face has been divided, which is also equal to the number of timing slits provided on plate 16 of FIG. 5. It should now be clear that if disk 14 rotates relative to disk 29, scanning slit 23, as shown in FIG. 6, reference to which should also now be made, will successively scan each radial line 50 and successively each individual element thereof. Numeral 55 in FIG. 3 indicates schematically means by which disk 29 might be supported. The longitudinal axis of this supporting means coincides with axis 13 of FIG. 1 as that plate 30 is parallel to plate 16**.

Returning again to FIG. 3, a single pair of timing slits 51 and 52 are provided coradial with radial slit **50*a*. Returning again to FIG. 1 it can be seen that a stationary light source 25 illuminates one side of plate 16 and hence will illuminate through timing slits 60 and 61 on that plate, especially when these latter slits are directly in front of light source 25. Additionally, timing slits 60 and 61 are located the same distance respectively from the center of plate 16 as are timing slits 51 and 52 located from the center of plate 30. Thus, 60 times during one full revolution of disk 14 with respect to disk 29 a timing slit 61 will be directly aligned with timing slit 52 so that light may proceed directly therethrough to a photocell 37 located in back of plate 30. Also, once during each revolution of disk 14 with respect to disk 29 timing slit 60 will be aligned with timing slit 51 so that light may proceed therethrough to photocell 36 also located behind plate 30. Signals from photocells 36 and 37 may now be used to provide synchronization between the rotation of the disks and signals applied to the light modulator 12**.

Since the synchronization means is not a part of this invention it will not be described. However, for example and not by way of limitation, a simple means of synchronization might comprise an oscillator whose frequency is set and synchronized to signals received from photocells 36 and 37, with the oscillator output frequency synchronizing the signals applied to light modulator 12. Other obvious modifications and alterations can also be made to this embodiment without departing from the true spirit of the invention. Accordingly, the invention is defined and limited by the appended claims.

The invention claimed is:

1. A mechanical raster scanner comprising:

a plurality of optical fiber bundles each said bundle having a first end and a second end, the fibers comprising each said bundle being arranged in an ordered manner;

image face means for supporting said first ends in an ordered array within a generally continuous opening thereof so that said first ends are held generally coplanar with one another to thereby form an image face;

scanned means having a center point for supporting said second ends in generally radial configurations individually for each said bundle with respect to and equally spaced radially from said center point and equally spaced about said center point, said second ends being supported generally coplanar with one another and defining a first plane;

a second optical fiber bundle having a third end constrained in a linear configuration and a fourth end constrained in a generally circular configuration;

means for supporting and sweeping said third end along a circular path about an axis interior of said circular path, said interior axis coinciding with a perpendicular to said center point whereby said swept circular path defines a second plane parallel to said first plane, said third end being supported askew with respect to a radial of said interior axis, but at a perpendicular distance from said interior axis identical to the distance of said second ends from said center point and wherein said fourth end is supported coaxially with said interior axis and defining a third plate parallel to said first and second planes and wherein said first and second planes are arranged in close proximity to one another, said second ends facing said third end, whereby said third end successively scans each second end as swept.

2. A mechanical raster scanner as recited in claim 1 wherein said second optical fiber bundle third end is constrained in a linear configuration within an area in said second plane defined by a projection of an area on said first plane onto said second plane and enclosed by adjacent second ends and concentric arcs struck from said center point connecting the extreme ends of said adjacent second ends.

3. A mechanical raster scanner as recited in claim 1 including means for providing signals corresponding to a visual image and a light modulator responsive to said signals and interposed in the optical path of said fourth end.

4. A mechanical raster scanner as recited in claim 2 with additionally a photocell viewing said fourth end through said light modulator.

5. A mechanical raster scanner as recited in claim 3 with additionally a light source for illuminating said fourth end through said light modulator.

6. A mechanical raster scanner as recited in claim 1 including means for providing electrical signals corresponding to an optical image and an electro-optical light modulator responsive to said electrical signals and interposed in the optical path of said fourth end.

7. A mechanical raster scanner as recited in claim 6 with additionally means for synchronizing said electrical signals with the sweeping of said third end.

8. A mechanical raster scanner as recited in claim 6 with additionally a photocell for receiving light signals from said fourth end through said electro-optical light modulator.

9. A mechanical raster scanner as recited in claim 8 wherein said electro-optical light modulator comprises a KDP crystal electrically connected to receive said electrical signals.

10. A mechanical raster scanner as recited in claim 9 with additionally means for synchronizing said electrical signals with the sweeping of said third end.

11. A mechanical raster scanner as recited in claim 6 with additionally a source of light for illuminating said fourth end through said electro-optical light modulator.

12. A mechanical raster scanner as recited in claim 11 wherein said electro-optical light modulator comprises a KDP crystal electrically connected to receive said electrical signals.

13. A mechanical raster scanner as recited in claim 12 with additionally means for synchronizing said electrical signals with the sweeping of said third end.

* * * * *